United States Patent

[11] 3,625,352

| | | |
|---|---|---|
| [72] | Inventor | Garry R. Perkins<br>Cary, Ill. |
| [21] | Appl. No. | 868,375 |
| [22] | Filed | Oct. 22, 1969 |
| [45] | Patented | Dec. 7, 1971 |
| [73] | Assignee | Spotnails, Inc.<br>Rolling Meadows, Ill. |

[54] LAMINATED FASTENER STRIP HAVING INNER AND OUTER LAMINAE OF DISPARATE MELTING POINTS
3 Claims, 6 Drawing Figs.

[52] U.S. Cl. ................................................ 206/56 DF
[51] Int. Cl. ........................................................ B65d 83/00
[50] Field of Search ........................................... 206/56 D;
227/136

[56] References Cited
UNITED STATES PATENTS

| | | | |
|---|---|---|---|
| 3,152,334 | 10/1964 | Lingle ........................ | 206/56 D |
| 3,357,761 | 12/1967 | Langas et al. ................. | 206/56 D |
| 3,471,008 | 10/1969 | Reich et al. ................... | 206/56 D |

Primary Examiner—Joseph R. Leclair
Assistant Examiner—Steven E. Lipman
Attorney—Pendleton, Neuman, Williams & Anderson ABSTRACT: The elongated tape comprises a flexible continuous outer laminae of a first plastic material heat-fused at first segments directly to opposed exterior portions of the fastener shanks spaced along said tape and laminated second segments alternately arranged with and interconnecting the first segments. Each second segment has an outer laminae formed of corresponding portions of the continuous outer laminae with a flexible inner lamina of a second plastic material. The melting point of the inner laminae of the second segment is lower than that of the outer laminae.

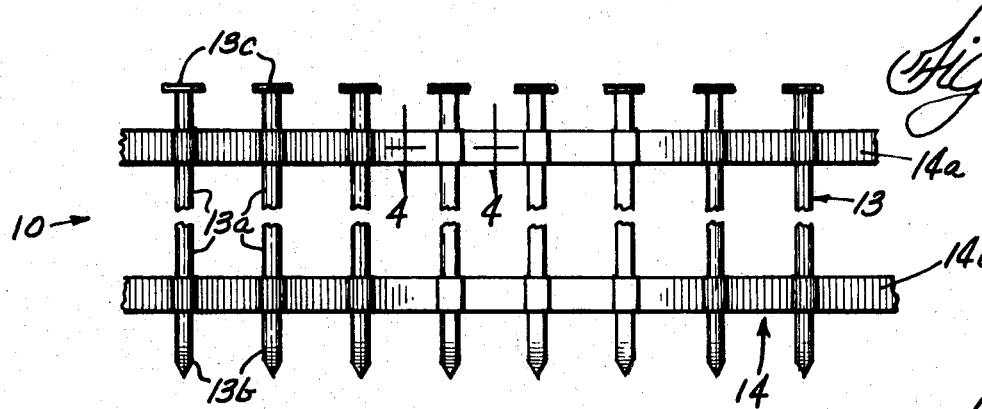
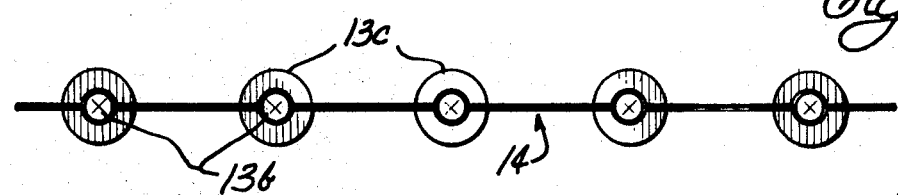
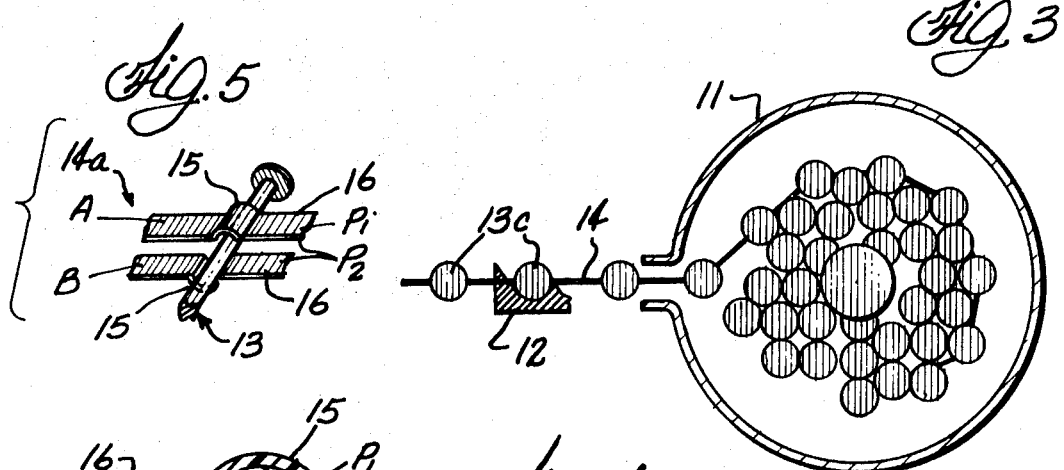
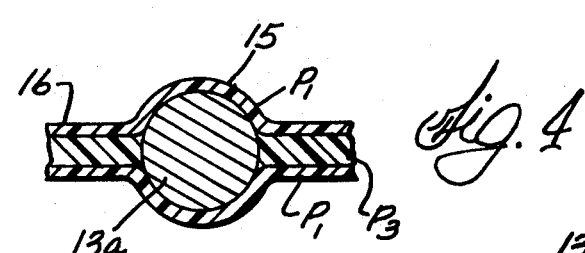
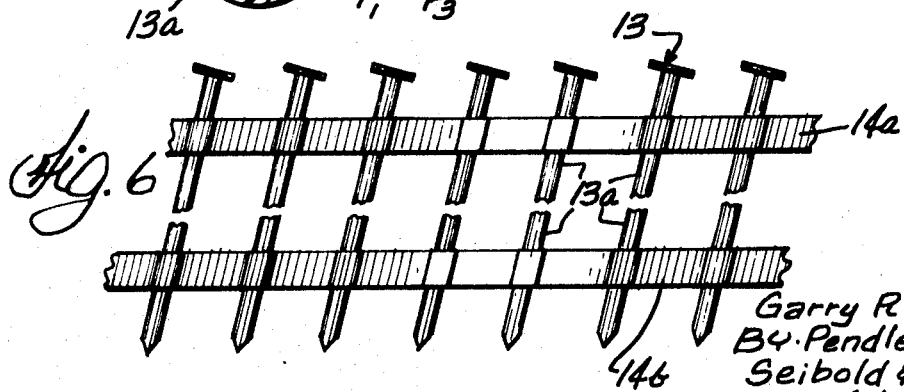

LAMINATED FASTENER STRIP HAVING INNER AND OUTER LAMINAE OF DISPARATE MELTING POINTS

BACKGROUND OF THE INVENTION

Various means have heretofore been proposed for collating fasteners, such as nails, screws, etc. whereby the collated fasteners can be readily fed through a power-actuated driving tool. In the past the use of fastener strips for this purpose was restricted to fasteners of a very limited size and type. Furthermore, the cost of the strip was oftentimes inordinately high because of the difficulty encountered in assembling the component parts of the strip. In addition, such prior fastener strips were frequently undesirable because of their susceptibility of becoming jammed in the tool, or due to the fact that the fastener when driven into the workpiece would carry with it a part of the web, tape, or the like used to interconnect the fasteners. In the latter instances, it normally required the carried part or fragment to be removed when the surface of the workpiece was to be finished and thus complicated such an operation.

In certain prior fastener strips, adhesive was utilized to adhere the fasteners to the web or tape with the result that when the adhesive was subjected to heat during storage of the strip, the fasteners would become disassembled from the web or tape thereby destroying the utility of the strip.

In still other prior fastener strips, the fasteners became disarrayed or disassembled when the strip was subjected to normal handling during storage or use.

SUMMARY OF THE INVENTION

Thus, it is an object of this invention to provide a fastener strip which is of simple, inexpensive construction, and is capable of accommodating fasteners varying over a wide range as to size, type, and number.

It is a further object of this invention to provide a fastener strip which facilitates reloading of a driving tool and thereby expedites operation thereof.

It is a still further object of this invention to provide a fastener strip which is capable of rapid feed and is sufficiently flexible that it may be arranged to form a compact package.

It is a still further object of this invention to provide a fastener strip which does not require special notching, perforating, or the like to facilitate breakaway of the fastener from the strip and does not cause fragments of the web or tape to be carried by the driven fastener into the workpiece.

Further and additional objects will appear from the description, accompanying drawing, and appended claims.

In accordance with one embodiment of the invention, a fastener strip is provided which includes a plurality of fasteners having elongated shanks, and flexible means for interconnecting the fasteners and retaining same in a predetermined spaced relation. The flexible means includes first segments which encompass and are fused to portions of the fastener shanks. The fused shank portions displace a predetermined amount of the material forming the flexible means, thereby rendering each first segment frangible when a predetermined driving force is exerted on the encompassed fastener. The flexible means also includes second segments which flexibly interconnect adjacent first segments and serve to properly space the fasteners when said strip is in a taut condition and being fed through a driving tool.

DESCRIPTION

For a more complete understanding of the invention reference should be made to the drawing wherein:

FIG. 1 is a fragmentary side-elevational view of one form of the improved fastener strip and showing the latter in a taut condition for feeding through a driving tool.

FIG. 2 is a bottom view of FIG. 1.

FIG. 3 is a fragmentary horizontal sectional view showing the strip of FIG. 1 loaded in the magazine and feed mechanism of a driving tool.

FIG. 4 is an enlarged sectional view taken along line 4—4 of FIG. 1.

FIG. 5 is a fragmentary perspective exploded view of the strip of FIG. 1.

FIG. 6 is similar to FIG. 1, but showing a modified form of fastener strip.

Referring now to the drawing and more particularly to FIG. 1, one form of an improved fastener strip 10 is shown which is adapted to be loaded into a suitable magazine 11 of a driving tool and then automatically fed therefrom by a feed mechanism 12 which may be pneumatically or electrically actuated when a trigger or the like, not shown, mounted on the tool is actuated. The tool and the various component parts thereof form no part of the instant invention.

The fastener strip 10 comprises a plurality of fasteners 13, the size, type, and number of which will depend upon the job to be performed and the size and shape of the tool magazine 11. The fasteners 13 in the illustrated embodiments are round-headed nails; however, other size and type of nails or screws, rivets, etc. may be utilized, if desired. Each fastener 13 is provided with an elongated shank 13a having a pointed leading end 13b and an enlarged head 13c disposed at the trailing end of the shank. The illustrated fastener 13 has the pointed leading end 13b thereof coated with a suitable adhesive material which has a distinctive color, coded to indicate a particular type and size of fastener. In addition, the coating increases the bonding effect between the workpiece and the fastener when the latter is driven into place. If desired, however, the color-coded coating may be omitted or disposed at some other location on the fastener.

In addition to the fasteners 13, the improved strip 10 comprises a flexible means 14 which includes a pair of elongated tape or web sections 14a and 14b arranged in spaced substantially parallel relation when the strip is in a taut condition. The elongated tape sections 14a and b extend transversely of the fastener shanks 13a.

In the preferred form, each tape section 14a or b is constructed from a pair of elongated laminated pieces A and B, see FIG. 5; each piece being formed from a thin laminated film (e.g. one lamina $P^1$ being of polyester and a second lamina $P^2$ being of polyolefin). The polyester lamina $P^1$ may have a thickness of 0.0005 to 0.005 inch, and the polyolefin lamina $P^2$ may have a thickness of 0.0003 to 0.015 inch. Each of the laminas has a predetermined but different melting temperature.

Each laminated piece A or B has formed therein a first segment 15 which partially conforms to and partially encompasses a portion of the fastener shank 13a. Corresponding first segments 15 of the pieces A and B cooperate to completely encompass the shank portion and are heat-fused thereto. In the course of being heat-fused to the corresponding first segments 15, the shank is heated to a predetermined temperature (e.g. 400°–450° F.) which is above the melting temperature of the polyolefin lamina $P^2$, but beneath the melting temperature of the polyester lamina $P^1$. As a result of this heated condition, the shank portion displaces a portion of the polyolefin lamina adjacent the shank and causes the shank portion to become fused directly to the polyester lamina $P^1$. By reason of displacing the polyolefin lamina, the tape section in the vicinity of the shank has a reduced thickness and thus is markedly more frangible than the remainder of the tape section. This thickness differential is important in that it permits the fastener, when being driven into a workpiece, not shown, to be severed cleanly from the remainder of the strip at a predetermined location without any fragments of the tape sections adhering to the fastener and being carried thereby to the exposed surface of the workpiece.

Besides the first segments 15, each laminated piece A or B includes second segments 16 which extend laterally from and between adjacent first segments 15. Corresponding second segments 16 have the polyolefin laminas $P^2$ thereof fused together to form a single double-thick polyolefin lamina $P^3$ which is sandwiched between the single polyester laminas $P_1$, see FIG. 4; all of said laminas cooperate to form relatively thick spacer units which interconnect adjacent first segments. Because of the thickness differential between the first and second segments, the second segment will remain intact and the first segment will readily fracture when a predetermined location whereby no fragment of the tape section will be carried by the driven fastener into the workpiece.

The heat-fusing of the shank portions to the lamina $P_1$ and the fusing of the laminas $P_2$ to form lamina $P_3$ is accomplished under heat and pressure and between a pair of complemental dies. In one method of assembling the strip 10, one tape section B is placed over the surface of one of the dies with the polyolefin lamina $P_2$ thereof face up, the fasteners 13 are then arranged as desired and laid upon the exposed lamina $P_2$ of the section B, the second tape section A is then placed over the fastener shanks and in registration with tape section B, and then the assembled components are heated and pressed between the dies. The foregoing sequence of assembly may be varied and performed expeditiously by automatic or semiautomatic equipment, the function and operation of which are well understood in this art.

If desired, a single, broader tape section may be substituted for the pair of tape sections as shown. On the other hand, where the fasteners have very long shanks the number of tape sections may be increased from that shown. In addition, other types of thermoplastic material may be used for the tape sections, if desired.

The relative positions of the fasteners 13 with respect to the tape sections 14a and b may be such that the sections are disposed obliquely, rather than at right angles, to the fastener shanks 13a, as seen in FIG. 6. Other arrangements of the fasteners and the tape sections besides those shown in FIGS. 1 and 6 may be utilized if desired.

Thus, it will be seen that a fastener strip has been provided which is simple and inexpensive to assemble, is capable of securely retaining the fasteners in their proper relative positions, notwithstanding abusive handling of the strip, and yet permits the fastener to be cleanly severed from the tape sections when it is being driven into a workpiece.

I claim:

1. A flexible fastener strip adapted to be fed when in a taut condition through a fastener-driving tool, said strip comprising a plurality of fasteners each having an elongated shank; and flexible plastic tape means circumferentially engaging and interconnecting said fastener shanks and maintaining said fasteners in a predetermined spaced relationship, said tape means having flexible continuous outer laminae of a first plastic material heat-fused at first segments directly to opposed exterior portions of said fastener shanks spaced along said tape means, and laminated second segments alternately arranged with and interconnecting said first segments, each second segment having outer laminae formed of corresponding portions of said continuous outer laminae with a flexible inner lamina of a second plastic material, the plastic materials of the inner and outer laminae of said second segments having a disparate melting points.

2. The flexible fastener strip of claim 1 wherein each outer lamina has a higher melting point than said inner lamina.

3. The flexible fastener strip of claim 2 wherein each outer lamina is of a polyester material and the inner lamina is of a polyolefin material.

* * * * *

UNITED STATES PATENT OFFICE
CERTIFICATE OF CORRECTION

Patent No. 3,625,352          Dated December 7, 1971

Inventor(s) Garry R. Perkins

It is certified that error appears in the above-identified patent and that said Letters Patent are hereby corrected as shown below:

Col. 1, line 19 - "as" should be __an__

Col. 3, line 2 - after "predetermined" insert:
--driving force is exerted on the head of the fastener. The fracturing of the first segment is clean and at a predetermined--

Col. 4, line 23, claim 1 - Delete "a".

Signed and sealed this 6th day of June 1972.

(SEAL)
Attest:

EDWARD M. FLETCHER, JR.       ROBERT GOTTSCHALK
Attesting Officer                Commissioner of Patents